United States Patent
Stewart

(12) 
(10) Patent No.: US 6,269,774 B1
(45) Date of Patent: Aug. 7, 2001

(54) RECEPTACLE ADAPTED TO RECEIVE A PLANT AND PROVIDE A SHELTERED HABITAT FOR A LIVING CREATURE

(76) Inventor: Donald G. Stewart, 1714 S. Vancouver Ct., Lakewood, CO (US) 80228

( * ) Notice: Subject to any disclaimer, the term of this patent is extended or adjusted under 35 U.S.C. 154(b) by 0 days.

(21) Appl. No.: 09/425,846

(22) Filed: Oct. 21, 1999

(51) Int. Cl.[7] .................. A01K 1/00; A01G 9/02
(52) U.S. Cl. .............. 119/430; 119/472; 119/459; 119/484; 119/452; 47/65.5; 47/41.01
(58) Field of Search .................. 119/430, 246, 119/247, 248, 472, 459, 468, 473, 478, 479, 482, 452, 484, 417; 220/4.13, 4.24, 4.27, 476, 482, 503, 504, 506, 532, 534, 541, 544, 545; 47/65.5, 66.6, 41.01, 67

(56) References Cited

U.S. PATENT DOCUMENTS

| | | | |
|---|---|---|---|
| D. 349,783 | * 8/1994 | Berger | D30/108 |
| 447,006 | * 2/1891 | Sweeney | 119/468 |
| 3,225,805 | * 12/1965 | Wise . | |
| 3,698,360 | * 10/1972 | Rubricus . | |
| 3,772,826 | * 11/1973 | Ferver | 47/66.6 |
| 4,104,986 | * 8/1978 | Dunigan | 119/469 |
| 4,147,131 | * 4/1979 | Walker . | |
| 4,347,807 | * 9/1982 | Reich | 119/499 |
| 4,944,419 | * 7/1990 | Chandler | 220/502 |
| 5,010,848 | * 4/1991 | Rankin | 119/461 |
| 5,082,139 | * 1/1992 | Quam | 220/530 |
| 5,092,277 | * 3/1992 | Baillie et al. | 119/165 |
| 5,320,064 | * 6/1994 | Selstad | 119/472 |
| 5,361,725 | * 11/1994 | Baillie et al. | 119/165 |
| 5,533,466 | * 7/1996 | Kohus et al. | 119/459 |
| 5,862,778 | * 1/1999 | Matsumoto | 119/472 |
| 5,975,017 | * 11/1999 | Cameron | 119/165 |
| 6,073,393 | * 6/2000 | Gutsche | 47/67 |
| 6,209,490 | * 4/2001 | Schwede | 119/473 |

* cited by examiner

*Primary Examiner*—Charles T. Jordan
*Assistant Examiner*—Yvonne R. Abbott
(74) *Attorney, Agent, or Firm*—Timothy J. Martin; Michael R. Henson; Mark H. Weygandt

(57) ABSTRACT

An apparatus for receiving a plant and providing a habitat for a living creature is comprised of a housing having an interior defined by a bottom portion and a surrounding sidewall that extends upwardly from the bottom portion. A divider disposed in the housing interior divides the interior into a first region and a second region. The first region communicates with the exterior environment via an aperture that is sized and adapted to permit entry of a living creature. The second region communicates with the exterior environment by an opening in the housing configured to permit a plant to be visibly disposed therein. The housing can include an access door in the bottom that enables cleaning of the first region. Where used as a birdhouse, a perch and a gable can be employed at the aperture. The perch can operate as a latch for the bottom door.

27 Claims, 4 Drawing Sheets

US 6,269,774 B1

RECEPTACLE ADAPTED TO RECEIVE A PLANT AND PROVIDE A SHELTERED HABITAT FOR A LIVING CREATURE

FIELD OF THE INVENTION

The present invention generally relates to decorative containers especially of the type that are used exterior to a living environment. Particularly, the present invention is directed to the combination of a manmade habitat for wildlife as well as a receptacle for living and artificial plants. This invention specifically concerns a hanging basket that is both a planter and a birdhouse.

BACKGROUND OF THE INVENTION

It is a common desire among many people to commune with nature by having contact with flora and fauna. In times past, such contact occurred frequently as a result of the rural condition of the population. However, increased urbanization saw masses of humanity moving from the rural environment into concentrated communities.

Urban development places high demands on land space, and it is not unusual for urban real estate to be extremely expensive on a surface square foot basis. Due to the value of land in urban communities, a relatively low percentage of land is devoted to parks and other open spaces wherein plants, such as trees, shrubbery, grassy areas as well as wildlife and other animals may live in harmony with the city dwellers.

Even where a park or other open space is available, many people desire to more closely associate themselves with plants and animals. This is especially true, in many instances, for apartment dwellers due to the paucity of green spaces appurtenant to apartment complexes. Accordingly, urban dwellers often place plants in their dwelling space, patios and yards as well as on balconies, window ledges, etc. This is true also even in suburban environments since outdoor furniture, cooking grills, storage units and the like compete for available space.

In addition to enjoying plants in their environment, many urban dwellers enjoy pets, wild birds and the like. In the case of wild birds, such people may desire to provide artificial nesting spaces, such as birdhouses, in order to attract the birds to viewing areas. For many people, the space devoted to birdhouses may also be the space devoted to planters, hanging baskets or other foliage receptacles. Even in those living quarters where more exterior space is available, there can be a competition between plant receiving receptacles and birdhouses for the available space.

Accordingly, there remains a need to provide new and improved items that conserve space while providing the benefits of flora and fauna in an aesthetically pleasing manner. The present invention is directed to meeting these needs.

SUMMARY OF THE INVENTION

It is an object of the present invention to provide a new and useful combination receptacle adapted to receive a plant and to provide a sheltered habitat for living creatures.

It is another object of the present invention to provide such a combination receptacle that is both rugged in construction yet relatively easy and inexpensive to produce.

It is a further object of the present invention to provide a combination receptacle for plants, birds and/or other living creatures, wherein the space for the living creature may be easily cleaned without disturbing the planted material.

Still another object of the present invention is to provide a combination receptacle that receives plants and provides shelter for birds and/or other living creatures that is space-saving in construction so that it may be used in urban patios, on porches, balconies and the like.

Yet another object of the present invention is to provide such a combination receptacle that is aesthetically pleasing, easily used and readily maintained.

It is still a further object of the present invention to provide a combination receptacle that can be suspended from a support so as to save floor space.

According to the present invention, then, a receptacle is provided that is adapted to receive a plant and to provide a sheltered habitat for a living creature. Broadly, the present invention includes a housing that has a bottom portion and a surrounding sidewall that extends upwardly to define a housing interior that is separated from the exterior environment. A divider is disposed in the housing interior and is oriented so as to separate the housing interior into a first region and a second region. The housing has an aperture that communicates between the first region and the exterior environment with this aperture being sized and adapted to permit a selected living creature entry into the first region from the exterior environment. Also, the housing has an opening, such as the mouth of the receptacle, which communicates between the second region and the exterior environment whereby a plant can be visibly disposed in the second region.

In the preferred embodiment of the present invention, the housing is frustoconical in shape so that the bottom portion is flat. The divider is formed as a flat panel that is mounted transversely to the central axis of the housing, preferably parallel to the planar bottom. This separates the housing into an upper region that may receive a plant and a lower region that provides a habitat for the living creature. Where a living plant is to be placed in the upper region, it is desirable that the flat panel have an outer peripheral edge that is seated and sealed against the surrounding sidewall to prevent passage of moisture therearound. Here, it is also preferred that a drain hole be provided through the sidewall and adjacent to the dividing panel so that water may drain from the second region to the exterior environment.

Moreover, it is anticipated that the present invention be used as a combination planter/birdhouse. Here, a perch is disposed on the housing at a location proximate to the aperture so it may provide a landing area for birds. The perch is formed as an elongated rod that projects exteriorly of the housing. Here, also, it is desired that a separate passageway that is distinct from the aperture be provided to communicate between the exterior environment and the first region so that the user may evacuate materials from the first region after abandonment by the living creature without disturbing the planted material. This passageway is preferably an opening through the bottom wall, and a removable door may be used to selectively close this passageway or open it to allow access to the interior of the first region. This door may be a removable door that is latched in the position by a portion of the perch that extends through the sidewall of the housing and engages a latching structure on the door. A gable structure may also be disposed on the exterior portion of the sidewall at a location above and proximate to the aperture that provides an entryway for the living creature.

The combination receptacle according to the present invention may be simply placed on a ledge or other support structure. Preferably, though, the receptacle is adapted for suspension from a support member such as a beam, eve, tree limb, etc. Here, suspension elements are provided and are secured to the housing so that it may be suspended from the support member. Preferably the receptacle is an inverted frustoconical structure having a circular upper rim or mouth, and the suspension elements are then secured to and positioned equiangularly around the opening.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention relates to receptacles that are adapted to receive a plant and to provide a sheltered habitat for birds and/or other living creatures, wherein the planter and sheltered habitat for living creatures are each independently fully functional while sharing a common housing. With the general and steady urbanization of the population resulting in the ever decreasing outdoor living space area adjacent to a dwelling, the consolidation and combination of functions of known devices typically used in outdoor living areas to save space is a desirable and beneficial result, provided that the benefit to the observer is preserved or enhanced.

While the preferred use of the present invention is as a combination planter and birdhouse, it should be understood that this receptacle may be used to provide a habitat for birds and/or other living creatures, as well. Thus, while the description of the exemplary embodiment is made with respect to the combination planter/birdhouse, it should be understood that many other structures having the dual function are contemplated within the scope of this invention. Thus, for example, the shape of the receptacle can be changed as well as the size of the aperture for the living creature, all of which is believed to be within the scope of the ordinarily skilled artisan.

Moreover, while it is contemplated that the receptacle of the present invention receive a living plant, such as a vine, flowers, etc., it should be understood that the receptacle according to the present invention may also be used to receive artificial foliage. Thus, by use of the word "plant" in this specification and claims, it is understood that such word encompasses not only living plants but artificial plants or other decorative materials, as well.

Figure 1:
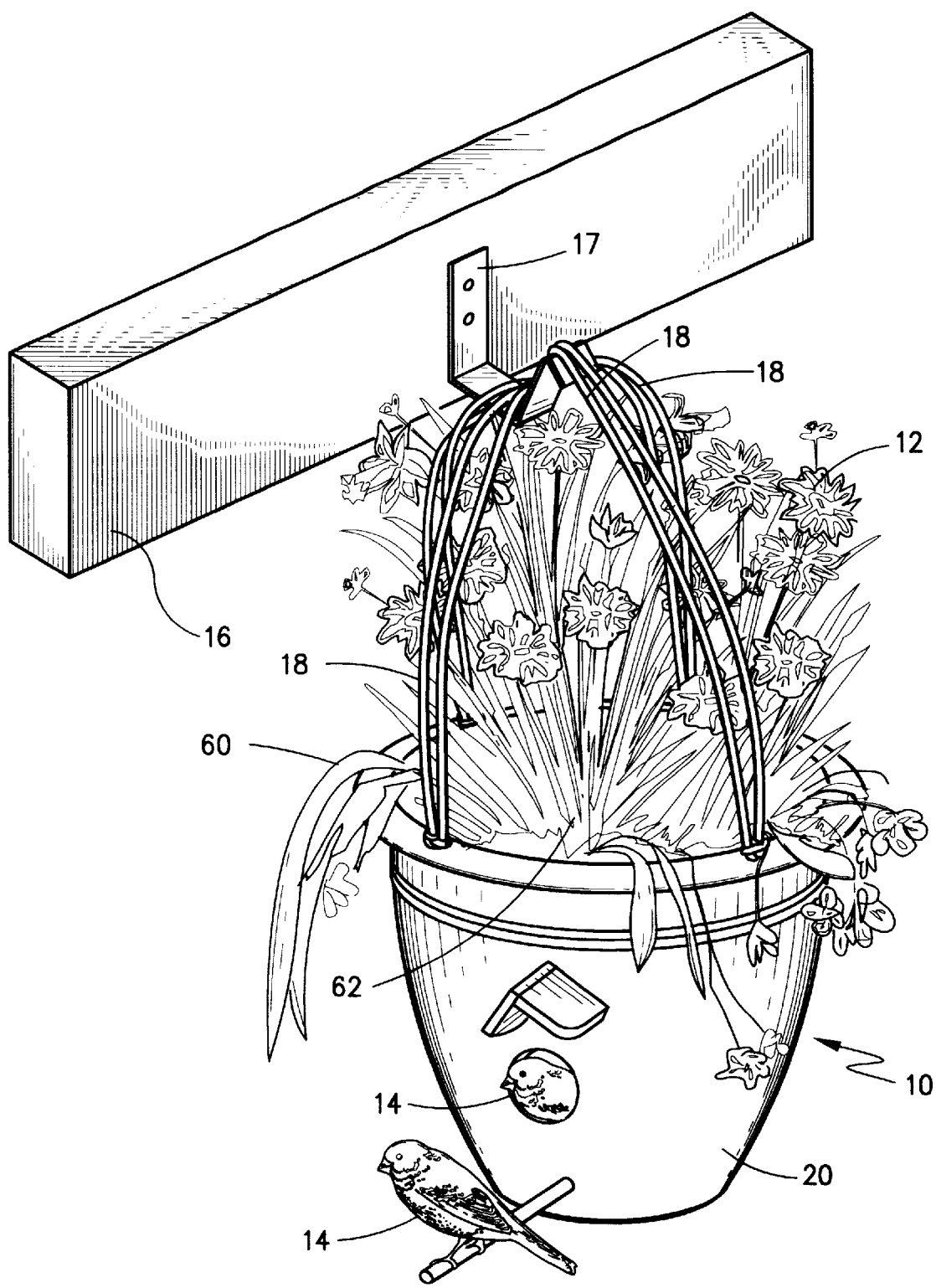
FIG. 1 is a perspective view of a receptacle adapted to receive a plant and to provide a sheltered habitat for a living creature according to a first exemplary embodiment of the present invention showing the receptacle suspended from a support member with plants and living creatures in their normal positions.
Figure 2:
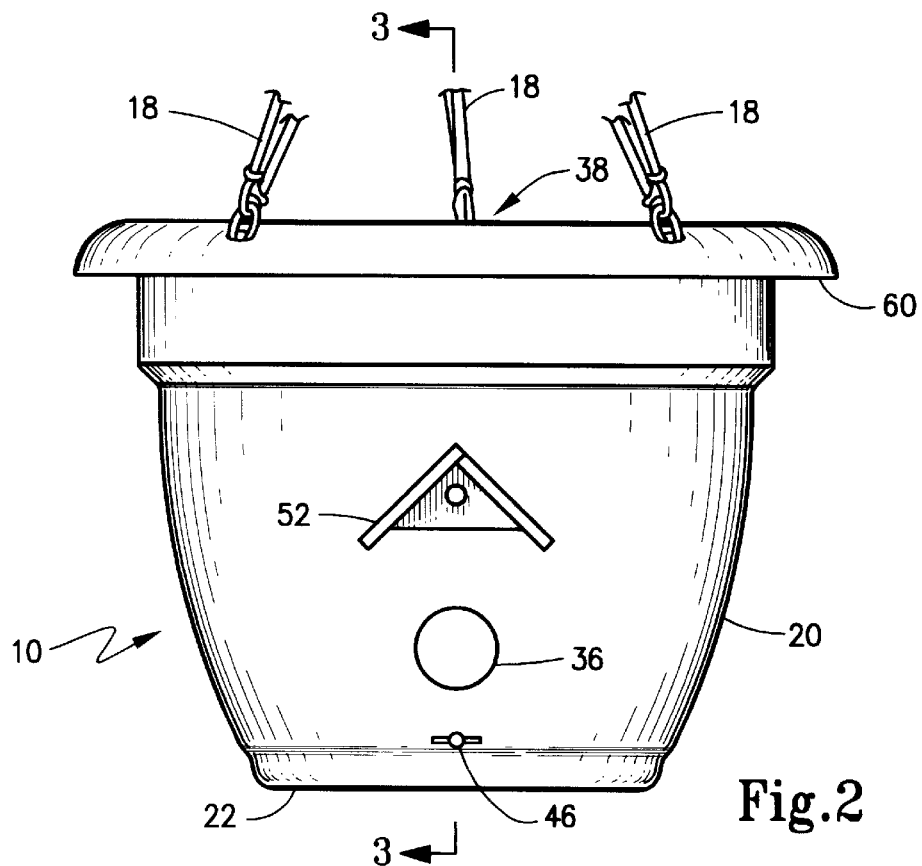
FIG. 2 is a front view in elevation of the receptacle shown in FIG. 1.

The exemplary embodiment of the invention is accordingly shown in use in FIG. 1. Here, receptacle 10 is adapted to receive a plant 12 or other type of foliage with the receptacle 10 also providing a sheltered habitat for a living creature or multiple living creatures such as birds 14. Receptacle 10 is shown suspended from a support member, here in the form of a patio beam 16, of the type commonly associated with apartment patios, which has a hook 17 secured thereto. Receptacle 10 is suspended from hook 17 by three flexible suspension elements 18 that are mounted equiangularly around the upper rim 60 of the housing 20, although a different number of suspension elements 18 could be used, securedly associated with receptacle 10 in any convenient known manner.

Figure 3:
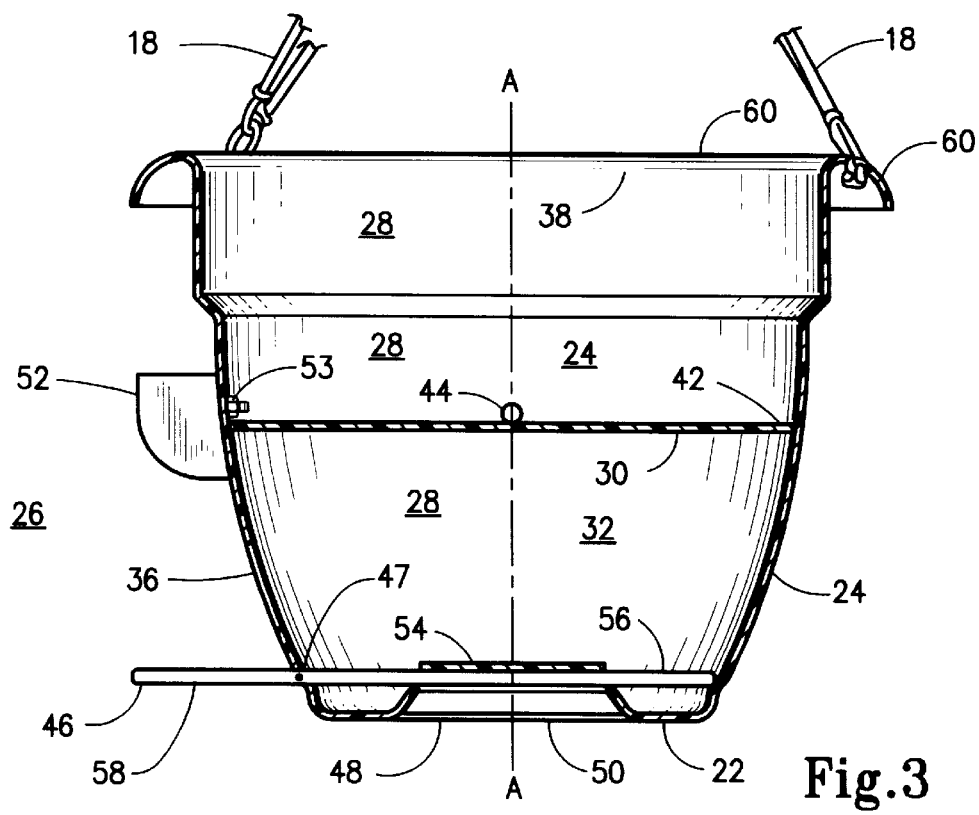
FIG. 3 is a cross-sectional view taken about lines 3—3 of FIG. 2.
Figure 4:
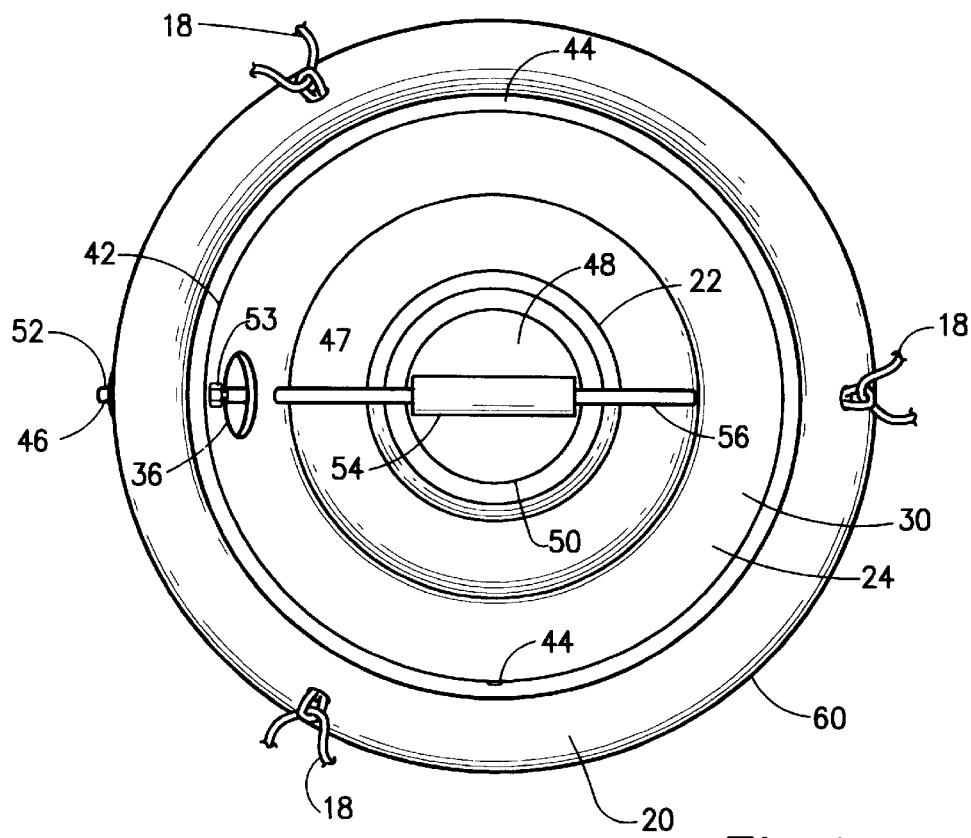
FIG. 4 is a top plan view of the receptacle shown in FIGS. 1–3.

Turning to FIGS. 2 through 6, it may be seen that receptacle 10 is formed as a housing 20, including flat bottom portion 22 and a surrounding sidewall 24 that extends upwardly from the bottom portion 22. As shown in FIG. 3, housing 20 has a central axis "A" that extends perpendicularly to bottom portion 22 at the center thereof. A divider in the form of flat panel 30 is disposed in the housing 20 to separate the interior 28 of housing 20 into a lower first region 32 and an upper second region 34 separate and distinct from the first region 32.

Housing 20 has an aperture 36 that allows communication between the first region 32 and the exterior environment 26. This aperture 36 is sized and adapted to permit a living creature or winged creature such as a bird 14 entry into the first region 32 from the exterior environment 26. Accordingly, first region 32 can provide a nesting habitat for birds 14.

An opening 38 is also provided for communication between the second region 34 and the exterior environment 26 so that a plant 12 can be visibly disposed in the second region 34. Preferably, opening 38 is defined by the open mouth of receptacle 10 that is the circular upper rim 60 of the frustoconical surrounding sidewall 24. This allows soil 62 and plant 12 to be placed in the second region 34 and supported by the divider panel 30 with the plant 12 protruding out of the housing 20. It should be understood that a different opening or openings could be provided into the second region to allow the placement of plant material. For example, it is possible that open bays be disposed in sidewall 24 circumferentially around receptacle 10 between divider panel 30 and upper rim 60. Indeed, in such case, it would be possible to enclose upper rim 60 so that the plant material is visible and extends outwardly from each of the bays. Other plant receiving structures are also contemplated within the scope of the present invention, all as would be apparent to the ordinarily skilled artisan.

Moreover, the housing 20 can assume a variety of shapes, for example, spherical, cylindrical, cubic, etc. In the exemplary embodiment, housing 20 of receptacle 10 is shown as being generally frustoconical in shape with a flat planar bottom portion 22 and with a divider panel 30 formed as a flat disc mounted transversely and perpendicularly to the central axis "A" of the housing 20. The present embodiment further shows the divider panel 30 being sealed on its outer peripheral edge 42 against the surrounding sidewall 24 to prevent the passage of moisture therearound. Any suitable environmentally friendly sealant or caulking compound may be employed, but such sealant or caulk should be water resistant in any event. The surrounding sidewall 24 is also provided with a drain hole 44 adjacent to the divider 30 to allow communication between the exterior environment 26 and the second region 34 whereby water in the second region 34 can drain downwardly out of the housing 20.

A perch 46 operates to provide a landing for a winged creature or bird 14 and is disposed proximately to the aperture 36. The perch 46 is formed as an elongated rod projecting exteriorly from the housing 20. The perch 46 can be disposed proximately to and below the aperture 36. A gable 52 may also be disposed on an exterior portion of the surrounding sidewall 24 proximate to the aperture 36. Gable 52 is preferably disposed above aperture 36 oppositely to perch 46. Gable 52 may be attached to sidewall 24 by fastener 53, or by other means as known in the art.

Figure 6:
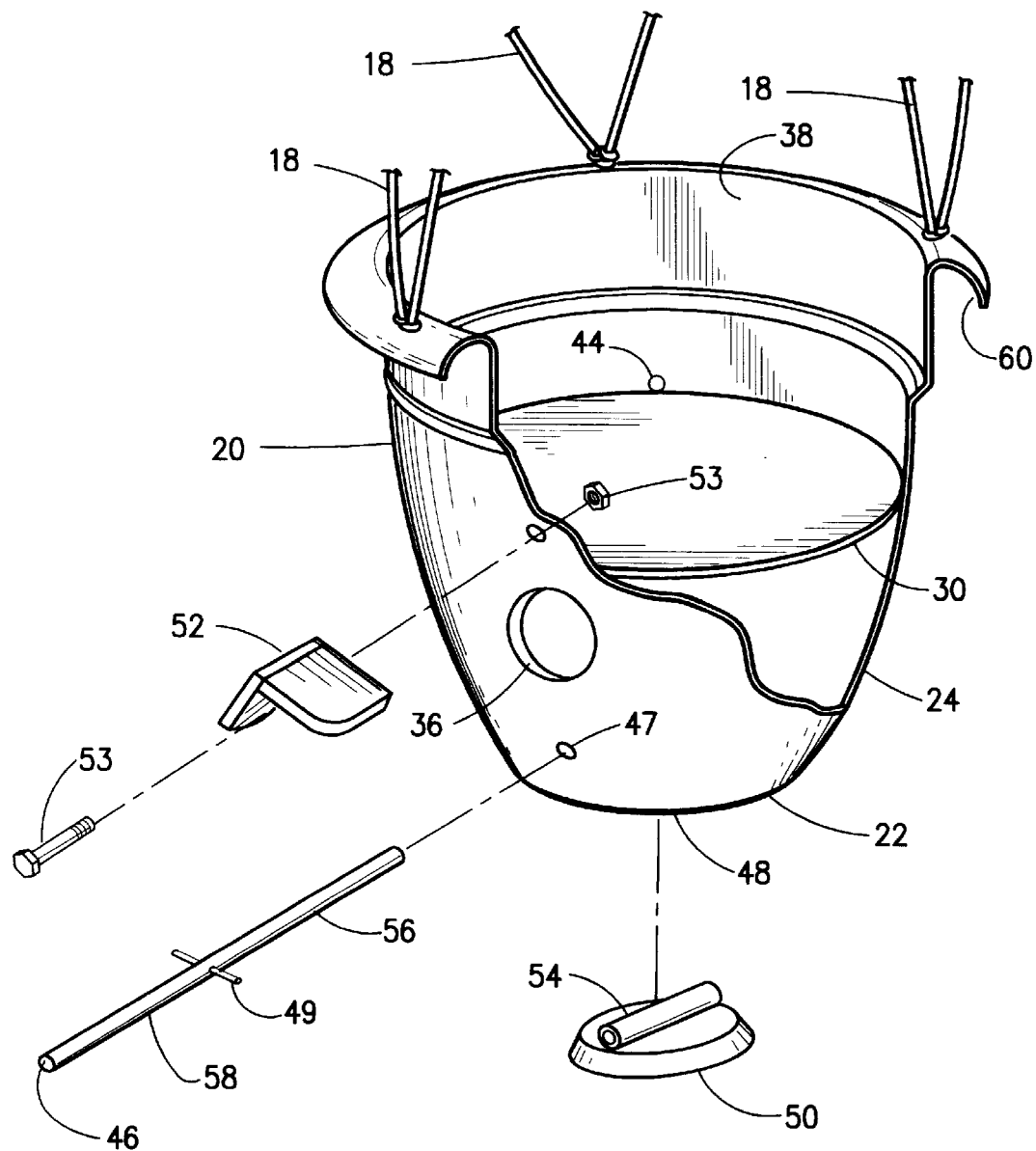
FIG. 6 is an exploded view in perspective showing the receptacle of FIGS. 1–5.

A passageway 48 that is distinct from the aperture 36 in the housing 20 allows communication between the exterior environment 26 and the first region 32 to allow evacuation of materials placed in the first region 32. Preferably, passageway 48 is formed as a circular opening through bottom portion 22. A removable door 50 is adapted to move between a closed state shown in FIG. 3 wherein the removable door 50 is positioned in the passageway 48 to prevent access to the first region 32 from the exterior environment 26 and a selectively optional open state as shown in FIG. 6, to permit access from the exterior environment 26 to the first region 32 through the passageway 48.

Figure 5:
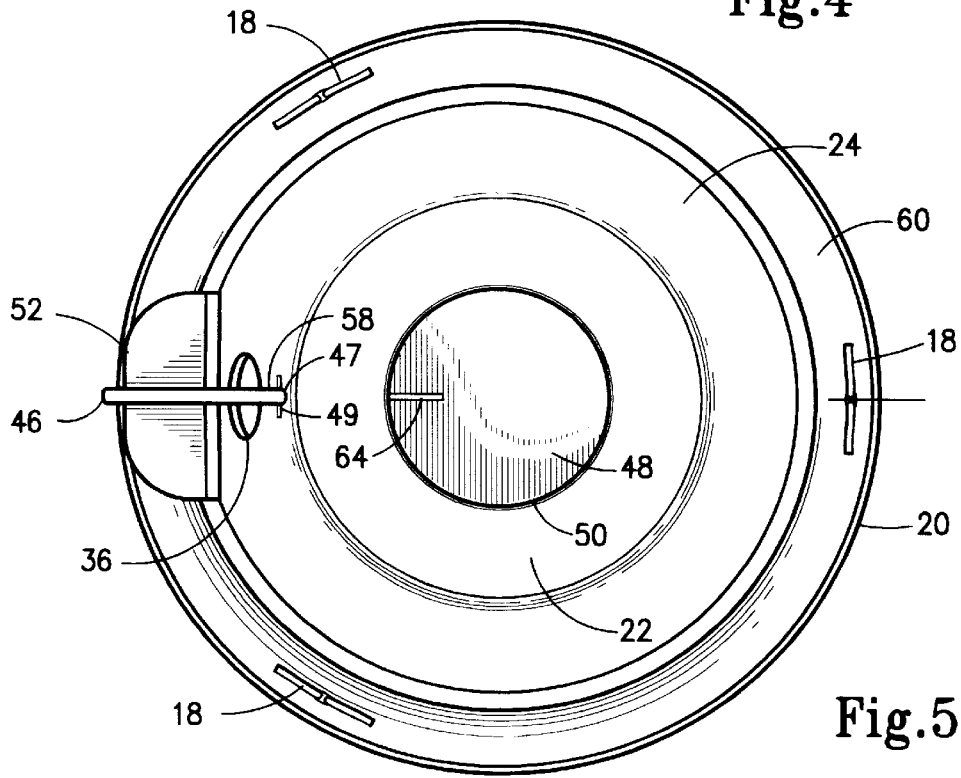
FIG. 5 is a bottom plan view of the receptacle shown in FIGS. 1–4.

Removable door 50 includes a latch structure in the form of a sleeve 54 mounted on the interior side of door 50. Perch 46 is then formed as an elongated removable rod including a proximal portion 56 projecting interiorly into the housing 20 and a distal portion 58 projecting exteriorly of the housing 20 with the proximal portion 56 of the rod defining the latch pin for sleeve 54 of the removable door 50. Here, perch 46 extends through bore 47 in sidewall 24. Perch 46 may optionally include a limit stop, such as protections 49, as shown in FIGS. 5 and 6.

In order to remove door 50 from receptacle 10, the user simple slides perch 46 outwardly so as to disengage proximal portion 56 from sleeve 54 after which door 50 may easily be removed. Door 50 is replaced in the closed state by reversal of this process. As shown in FIG. 5, in order to facilitate replacement of removable door 50, an alignment mark 64 is provided on door 50. When alignment mark 64 is positioned in alignment with bore 47, such alignment indicates that sleeve 54 is aligned with bore 47 so that perch 46 may directly engage sleeve 54.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A receptacle adapted to receive a plant and to provide a sheltered habitat for a living creature, comprising:
   (a) a housing including a bottom portion and a solid surrounding sidewall extending upwardly from said bottom portion to define a housing interior separated from an exterior environment and terminating in an upper rim thereby to define an opening;
   (b) a divider transversely disposed in the housing interior in spaced relation from a portion of the upper rim and oriented to separate the housing interior into a first region and a second region, said housing having an aperture formed through the sidewall with the aperture establishing communication between the first region and the exterior environment and sized and adapted to permit a living creature entry into the first region from the exterior environment, and the opening defined by said upper rim being sized and adapted to receive a plant therein whereby the plant can be visibly disposed in the second region with said divider panel supporting the plant when placed therein; and
   (c) a passageway formed as an opening through said bottom portion and having a removable door operative to move between a closed state and an open state, said passageway distinct from said aperture and in a spaced relation to said aperture.

2. A receptacle according to claim 1 wherein said housing is frustoconical in shape and wherein said housing has a flat planar bottom.

3. A receptacle according to claim 1 wherein said divider is formed as a flat panel that is mounted transversely to a central axis of said housing.

4. A receptacle according to claim 1 wherein said divider has an outer peripheral edge that is sealed against said sidewall to prevent passage of moisture therearound.

5. A receptacle according to claim 4 wherein said housing is provided with a drain hole adjacent to said divider and communicating between the exterior environment and the second region whereby water in the second region can drain out of said second region.

6. A receptacle according to claim 1 including a perch operative to provide a landing for a winged creature.

7. A receptacle according to claim 6 wherein said perch is disposed proximately to said aperture.

8. A receptacle according to claim 6 wherein said perch is formed as an elongated rod projecting exteriorly of said housing.

9. A receptacle according to claim 1 wherein said passageway communicates between the exterior environment and the first region to allow evacuation of materials placed in the first region.

10. A receptacle according to claim 9 wherein said removable door is in the closed state when positioned in the passageway to prevent access to the first region from the exterior environment, and in the open state when positioned to permit access from the exterior environment to the first region through the passageway.

11. A receptacle according to claim 1 including a plurality of suspension elements secured to said housing and adapted to suspend said housing from a support member.

12. A receptacle adapted for support in an exterior environment and operative to receive a plant and to provide a sheltered habitat for a living creature, comprising:
   (a) a housing including a bottom portion and a surrounding sidewall extending upwardly from said bottom portion to define a housing interior and an upper rim, said sidewall formed as a one-piece unitary construction with said upper rim defining an upwardly facing opening; and
   (b) a flat divider panel disposed in the housing interior and oriented to divide the housing interior into a lower region and an upper region separated from the lower region, said housing having an aperture communicating between the lower region and the exterior environment and sized and adapted to permit a living creature entry into the lower region from the exterior environment, said opening defined by said upper rim communicating between the upper region and the exterior environment whereby a plant can be visibly disposed in the second region, and said housing having a drain hole adjacent to said divider panel and communicating between the exterior environment and the upper region whereby water in the upper region can drain out of said housing.

13. A receptacle according to claim 12 wherein said divider panel has a peripheral edge that is sealed against said sidewall to prevent passage of moisture therearound.

14. A receptacle according to claim 12 including a perch operative to provide a landing for a winged creature, said perch being disposed proximately to and below said aperture.

15. A receptacle according to claim 14 including a gable structure disposed on an exterior portion of said sidewall proximate to the aperture oppositely to said perch.

16. A receptacle according to claim 12 wherein said housing has a passageway distinct from the aperture and communicating between the exterior environment and the lower region to allow evacuation of materials from the lower region, and including a removable door operative to selectively open and close the passageway.

17. A receptacle adapted for support in an exterior environment and operative to receive a plant and to provide a sheltered habitat for a bird, comprising:
(a) a housing including a bottom wall and a surrounding sidewall extending upwardly from said bottom wall to define a housing interior;
(b) a divider disposed in the housing interior and oriented to separate the housing interior into a first region and a second region separated from the first region, said housing having an aperture communicating between the first region and the exterior environment and sized and adapted to permit a bird entry into the first region from the exterior environment, said housing having an opening communicating between the second region and the exterior environment whereby a plant can be visibly disposed in the second region, and said housing having a passageway formed in said bottom wall of the receptacle with the passageway being distinct from the aperture and the opening and communicating between the exterior environment and the first region to allow evacuation of materials placed in the first region;
(c) a movable door adapted to move between a closed state wherein said door is positioned in the passageway to prevent access to the first region from the exterior environment and an open state to permit access from the exterior environment to the first region through the passageway; and
(d) a latch operative to selectively retain said door in the closed state.

18. A receptacle according to claim 17 including a perch operative to provide a landing for a bird, said perch being disposed proximately to said aperture.

19. A receptacle according to claim 18 wherein said perch is formed as an elongated removable rod including a proximal portion projecting interiorly of said housing and a distal portion projecting exteriorly of said housing, said proximal portion of said rod defining said latch for said door.

20. A receptacle according to claim 17 wherein said divider is formed as a flat panel that is mounted transversely to a central axis of said housing to divide the interior into a lower region defining the first region and an upper region defining the second region.

21. A receptacle according to claim 17 wherein the opening is defined by an upper rim of said sidewall whereby soil and a plant can be disposed in the second region and can be supported by said divider with said plant protruding out of said housing.

22. A receptacle adapted to receive a plant and to provide a sheltered habitat for a living creature, comprising:
(a) a housing including a bottom portion and a surrounding sidewall extending upwardly from said bottom portion to define a housing interior separated from an exterior environment;
(b) a divider disposed in the housing interior and oriented to separate the housing interior into a first region and a second region separated from the first region, said housing having an aperture communicating between the first region and the exterior environment and sized and adapted to permit a living creature entry into the first region from the exterior environment, said housing having an opening communicating between the second region and the exterior environment whereby a plant can be visibly disposed in the second region; and
(c) a gable structure disposed on an exterior portion of said sidewall proximate to the aperture.

23. A receptacle adapted for support in an exterior environment and operative to receive a plant and to provide a sheltered habitat for a bird, comprising:
(a) a housing including a bottom portion and a surrounding sidewall extending upwardly from said bottom portion to define a housing interior;
(b) a divider disposed in the housing interior and oriented to separate the housing interior into a first region and a second region separated from the first region, said housing having an aperture communicating between the first region and the exterior environment and sized and adapted to permit a bird entry into the first region from the exterior environment, said housing having an opening communicating between the second region and the exterior environment whereby a plant can be visibly disposed in the second region, and said housing having a passageway distinct from the aperture and the opening and communicating between the exterior environment and the first region to allow evacuation of materials placed in the first region;
(c) a movable door adapted to move between a closed state wherein said door is positioned in the passageway to prevent access to the first region from the exterior environment and an open state to permit access from the exterior environment to the first region through the passageway;
(d) a latch operative to selectively retain said door in the closed state; and
(e) a perch operative to provide a landing for a bird, said perch being disposed proximately to said aperture and formed as an elongated removable rod including a proximal portion projecting interiorly of said housing and a distal portion projecting exteriorly of said housing, said proximal portion of said rod defining said latch for said door.

24. A receptacle adapted for support in an exterior environment and operative to receive a plant and to provide a sheltered habitat for a bird, comprising:
(a) a housing including a bottom portion and a surrounding sidewall extending upwardly from said bottom portion to define a housing interior;
(b) a divider formed as a flat panel that is mounted transversely to a central axis of said housing and is disposed in the housing interior and oriented to separate the housing interior into a lower first region and an upper second separated from the first region, said flat panel has a peripheral edge that is sealed against said sidewall to prevent passage of moisture therearound and wherein said housing is provided with a drain hole adjacent to said flat panel and communicating between the exterior environment and the upper region whereby water in the upper region can drain out of said housing.
(c) an aperture communicating between the lower first region and the exterior environment and sized and adapted to permit a bird entry into the first region from the exterior environment, (d) an opening communicating between the second region and the exterior environment whereby a plant can be visibly disposed in the second region, and said housing having a passageway distinct from the aperture and the opening and communicating between the exterior environment and the first region to allow evacuation of materials placed in the first region;

(e) a movable door adapted to move between a closed state wherein said door is positioned in the passageway to prevent access to the first region from the exterior environment and an open state to permit access from the exterior environment to the first region through the passageway; and (f) a latch operative to selectively retain said door in the closed state.

25. A receptacle adapted for support in an exterior environment and operative to receive a plant and to provide a sheltered habitat for a bird, comprising:

(a) a housing including a bottom portion and a surrounding sidewall extending upwardly from said bottom portion to define a housing interior;

(b) a divider disposed in the housing interior and oriented to separate the housing interior into a first region and a second region separated from the first region, said housing having an aperture communicating between the first region and the exterior environment and sized and adapted to permit a bird entry into the first region from the exterior environment, said housing having an opening defined by an upper rim of said sidewall whereby soil and a plant can be disposed in the second region and can be supported by said divider with said plant protruding out of said housing, said opening operative to communicate between the second region and the exterior environment whereby a plant can be visibly disposed in the second region, and said housing having a passageway distinct from the aperture and the opening and communicating between the exterior environment and the first region to allow evacuation of materials placed in the first region;

(c) a plurality of suspension elements secured to said upper rim and adapted to suspend said housing from a support member;

(d) a movable door adapted to move between a closed state wherein said door is positioned in the passageway to prevent access to the first region from the exterior environment and an open state to permit access from the exterior environment to the first region through the passageway; and (e) a latch operative to selectively retain said door in the closed state.

26. A receptacle according to claim 25 wherein the opening is circular, and wherein said suspension elements are flexible members mounted equiangularly around the opening.

27. A receptacle adapted to receive a plant and to provide a sheltered habitat for a living creature, comprising:

(a) a housing including a bottom portion and a surrounding sidewall extending upwardly from said bottom portion to define a housing interior separated from an exterior environment, said sidewall being upwardly divergent and terminating in an upper rim;

(b) a divider disposed in the housing interior and oriented to separate the housing interior into a first region and a second region, said housing having an aperture communicating between the first region and the exterior environment and sized and adapted to permit a living creature entry into the first region from the exterior environment, said housing having an opening communicating between the second region and the exterior environment whereby a plant can be visibly disposed in the second region; and (c) a passageway formed as an opening through said bottom portion and having a removable door operative to move between a closed state and an open state, said passageway distinct from said aperture and in a spaced relation to said aperture.

* * * * *